(12) United States Patent
Okada et al.

(10) Patent No.: US 7,873,221 B2
(45) Date of Patent: Jan. 18, 2011

(54) IMAGE PROCESSING APPARATUS, IMAGE PROCESSING METHOD, PROGRAM FOR IMAGE PROCESSING METHOD, AND RECORDING MEDIUM WHICH RECORDS PROGRAM FOR IMAGE PROCESSING METHOD

(75) Inventors: Miyuki Okada, Kanagawa (JP); Yoshihiro Suzuki, Kanagawa (JP)

(73) Assignee: Sony Corporation (JP)

( * ) Notice: Subject to any disclaimer, the term of this patent is extended or adjusted under 35 U.S.C. 154(b) by 934 days.

(21) Appl. No.: 11/599,561

(22) Filed: Nov. 14, 2006

(65) Prior Publication Data

US 2007/0110321 A1 May 17, 2007

(30) Foreign Application Priority Data

Nov. 14, 2005 (JP) .......................... P2005-328256

(51) Int. Cl.
*G06K 9/62* (2006.01)
(52) U.S. Cl. ....................... 382/209; 382/216; 382/218; 382/219; 382/227
(58) Field of Classification Search ................. 382/209, 382/216, 218, 219, 227
See application file for complete search history.

(56) References Cited

U.S. PATENT DOCUMENTS

| | | | |
|---|---|---|---|
| 6,219,640 B1 | 4/2001 | Basu et al. | |
| 2005/0207649 A1* | 9/2005 | Enomoto et al. | ............ 382/190 |

FOREIGN PATENT DOCUMENTS

| | | |
|---|---|---|
| EP | 1 693 783 | 8/2006 |
| JP | 2001285787 A | 10/2001 |
| JP | 2001-330882 A | 11/2001 |
| JP | 2003036439 A | 2/2003 |
| JP | 2003-075717 A | 3/2003 |
| JP | 2004-030629 A | 1/2004 |
| JP | 2005157911 A | 6/2005 |
| JP | 2005269473 A | 9/2005 |

OTHER PUBLICATIONS

Kah-Kay Sung et al., "Example-Based Learning for View-Based Human Face Detention", Image Understanding Workshop. Proceedings, vol. 2, Nov. 13, 1994, pp. 843-850.
Postolache et al., "Pyramidal Approach to License Plate Segmentation", Journal of Electronic Imaging, SPIE/IS&T, US, vol. 5, No. 3, Jul. 1996, pp. 402-409.
Huang, Journal of Yunnan University, 27(5A); 327-332 (2005). (English translation of abstract only).
Office Action from Japanese Application No. 2005-328256, dated Aug. 3, 2010.

* cited by examiner

*Primary Examiner*—Matthew C Bella
*Assistant Examiner*—Mike Rahmjoo
(74) *Attorney, Agent, or Firm*—Lerner, David, Littenberg, Krumholz & Mentlik, LLP

(57) ABSTRACT

An image processing apparatus includes: an image acquisition section which acquires an original image; a resolution conversion section which converts the resolution of the original image acquired by the image acquisition section and generates a plurality of reduced images having different resolutions; a detection section which processes by template matching the plurality of reduced images generated by the resolution conversion section and detects an area occupied by a picked-up image of a particular object corresponding to the template, from the reduced images; and a detection result processing section which detects the area occupied by the picked-up image of the particular object on the original image, by processing a detection result obtained by the detection section, the detection section detecting the area occupied by the picked-up image of the particular object by processing the plurality of reduced images in an order in which resolution sequentially varies on a step-by-step basis.

16 Claims, 9 Drawing Sheets

IMAGE PROCESSING APPARATUS, IMAGE PROCESSING METHOD, PROGRAM FOR IMAGE PROCESSING METHOD, AND RECORDING MEDIUM WHICH RECORDS PROGRAM FOR IMAGE PROCESSING METHOD

BACKGROUND OF THE INVENTION

1. Field of the Invention

The present invention relates to an image processing apparatus, an image processing method, a program for the image processing method, and a recording medium which records the program for image processing method, and can be applied, for example, to digital still cameras. The present invention makes it possible to detect areas respectively occupied by picked-up images of particular objects by performing template matching of reduced images in an order in which resolution sequentially varies on a step-by-step basis, thereby detecting the respective areas occupied by the picked-up images of the particular objects and appropriately setting the priority order.

2. Description of Related Art

In the field of digital still cameras, video cameras and the like, it has heretofore been proposed to provide a method of detecting an area occupied by a picked-up image of a particular object from an image pickup result and controlling an image pickup system on the basis of the image pickup result of the area. In this method, the face of a person is mainly applied to the particular object, and an area occupied by a picked-up image of the particular object, for example, an area of skin color, is detected as by template matching using a template.

As to such a method, Japanese Patent Application Publication Number 2004-30629 proposes a device related to detection of an area occupied by a picked-up image of a face in template matching using a template.

The processing of detecting an area occupied by a picked-up image of a particular object from an image pickup result in this manner needs to be executed at sufficiently high speed so that the process can track the movement of an image pickup apparatus and an object. In addition, there is a case where areas respectively occupied by picked-up images of particular objects are detected at a plurality of locations, and in this case, it is necessary to appropriately set the priority order of the areas detected at the plurality of locations in order to determine which of the areas is to be processed at highest priority.

SUMMARY OF THE INVENTION

The present invention has been made in view of the above-mentioned issue, and provides an image processing apparatus and method capable of detecting an area occupied by a picked-up image of a particular object and appropriately setting the priority order, and a program for the image processing method, as well as a recording medium which records the program for the image processing method.

In accordance with a first preferred embodiment of the present invention, there is provided an image processing apparatus which includes an image acquisition section which acquires an original image, a resolution conversion section which converts the resolution of the original image acquired by the image acquisition section and generates a plurality of reduced images having different resolutions, a detection section which processes by template matching using a template the plurality of reduced images generated by the resolution conversion section and detects an area occupied by a picked-up image of a particular object corresponding to the template, from the reduced images, and a detection result processing section which detects the area occupied by the picked-up image of the particular object on the original image, by processing a detection result obtained by the detection section, the detection section detecting the area occupied by the picked-up image of the particular object by processing the plurality of reduced images in an order in which resolution sequentially varies on a step-by-step basis.

In accordance with a second preferred embodiment of the present invention, there is provided an image processing method which includes an image acquisition step of acquiring an original image, a resolution conversion step of converting the resolution of the original image acquired in the image acquisition step and generating a plurality of reduced images having different resolutions, a detection step of processing by template matching using a template the plurality of reduced images generated in the resolution conversion step and detecting an area occupied by a picked-up image of a particular object corresponding to the template, from the reduced images, and a detection result processing step of detecting the area occupied by the picked-up image of the particular object on the original image, by processing a detection result obtained in the detection step, the detection step detecting the area occupied by the picked-up image of the particular object by processing the plurality of reduced images in an order in which resolution sequentially varies on a step-by-step basis.

In accordance with a third preferred embodiment of the present invention, there is provided a program for an image processing method, which processes images by being executed by operation processing means, the program including an image acquisition step of acquiring an original image, a resolution conversion step of converting the resolution of the original image acquired in the image acquisition step and generating a plurality of reduced images having different resolutions, a detection step of processing by template matching using a template the plurality of reduced images generated in the resolution conversion step and detecting an area occupied by a picked-up image of a particular object corresponding to the template, from the reduced images, and a detection result processing step of detecting the area occupied by the picked-up image of the particular object on the original image, by processing a detection result obtained in the detection step, the detection step detecting the area occupied by the picked-up image of the particular object by processing the plurality of reduced images in an order in which resolution sequentially varies on a step-by-step basis.

In accordance with a fourth preferred embodiment of the present invention, there is provided a recording medium which records a program for an image processing method of processing images by being executed by operation processing means, the program including an image acquisition step of acquiring an original image, a resolution conversion step of converting the resolution of the original image acquired in the image acquisition step and generating a plurality of reduced images having different resolutions, a detection step of processing by template matching using a template the plurality of reduced images generated in the resolution conversion step and detecting an area occupied by a picked-up image of a particular object corresponding to the template, from the reduced images, and a detection result processing step of detecting the area occupied by the picked-up image of the particular object on the original image, by processing a detection result obtained in the detection step, the detection step detecting the area occupied by the picked-up image of the particular object by processing the plurality of reduced images in an order in which resolution sequentially varies on a step-by-step basis.

The image processing apparatus according to the first preferred embodiment of the present invention includes the image acquisition section which acquires an original image, the resolution conversion section which converts the resolution of the original image acquired by the image acquisition section and generates a plurality of reduced images having different resolutions, the detection section which processes by template matching using a template the plurality of reduced images generated by the resolution conversion section and detects an area occupied by a picked-up image of a particular object corresponding to the template, from the reduced images, and the detection result processing section which detects the area occupied by the picked-up image of the particular object on the original image, by processing a detection result obtained by the detection section, the detection section detecting the area occupied by the picked-up image of the particular object by processing the plurality of reduced images in an order in which resolution sequentially varies on a step-by-step basis. According to this construction, areas respectively occupied by picked-up images of particular objects are detected in order from the largest object or in order from the smallest object, so that the priority order related to the sizes of the areas can be set on the basis of the order of detection. In addition, the process can be stopped as needed to detect an objective area in a short time, so that the areas occupied by the picked-up images of the respective particular objects can be detected at high speed to appropriately set the priority order.

In addition, according to the second, third and fourth preferred embodiments, it is possible to provide an image processing method capable of detecting areas respectively occupied by picked-up images of particular objects and appropriately setting the priority order, and a program for the image processing method, as well as a recording medium which records the program for the image processing method.

According to the embodiments of the present invention, it is possible to detect an area occupied by a picked-up image of a particular object and appropriately set the priority order.

BRIEF DESCRIPTION OF THE DRAWINGS

The invention will become more readily appreciated and understood from the following detailed description of preferred embodiments of the invention when taken in conjunction with the accompanying drawings, in which.

DESCRIPTION OF THE PREFERRED EMBODIMENTS

Preferred embodiments of the present invention will be described below in detail with reference to the accompanying drawings.

A first embodiment of the present invention will be described below.

(1) Construction of the First Embodiment

Figure 2:
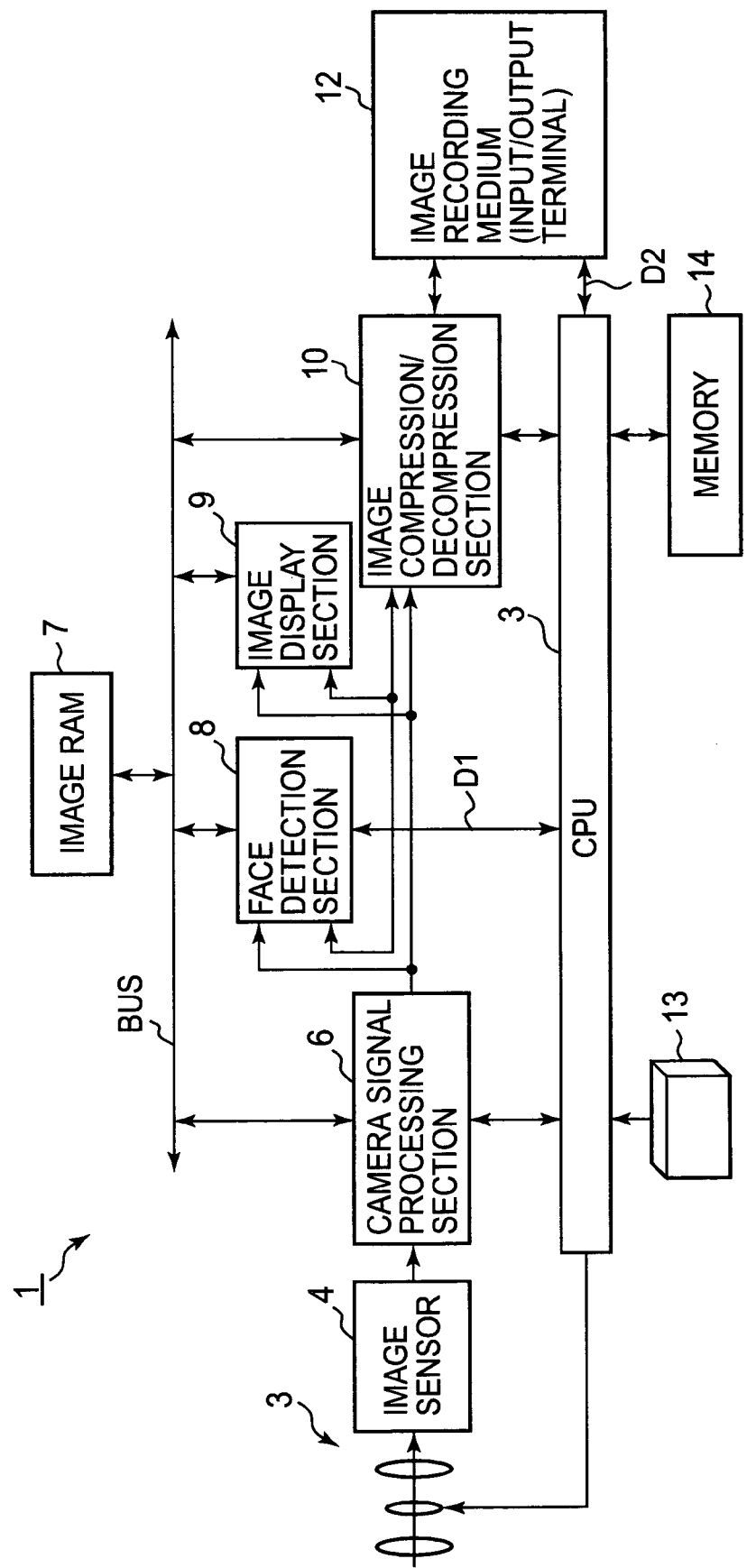
FIG. 2 is a block diagram showing the image pickup apparatus according to the first embodiment of the present invention.

FIG. 2 is a block diagram showing an image pickup apparatus according to the first embodiment of the present invention. An image pickup apparatus 1 is a digital still camera which acquires and records an image pickup result of a desired object in the form of a still image or a moving image.

In the image pickup apparatus 1, a lens 2, under the control of a central processing unit (CPU) 3, converges incident light while varying its aperture, focus and zoom ratio, to form an optical image of an object on an image pickup surface of an image sensor 4.

The image sensor 4 outputs an image pickup result of the optical image formed on the image pickup surface by the lens 2, in the form of a moving image or a still image, through the photoelectric conversion processing of individual photosensitive elements arranged on the image pickup surface.

A camera signal processing section 6, under the control of the central processing unit 3, receives the image pickup result outputted from the image sensor 4, executes signal processing such as matrix operation, gamma correction and white balance adjustment, and outputs image data representative of the result of the signal processing to an image bus BUS.

In addition, during this signal processing, the camera signal processing section 6 generates and outputs image data for use in monitoring in an image display section 9 and original image data for use in face detection in a face detection section 8. In the first embodiment, the original image data uses the monitoring image data, for example, image data conforming to a VGA (Video Graphics Array) format of 640 pixels×380 pixels or image data of 320 pixels×240 pixels. Accordingly, in the first embodiment, the lens 2, the image sensor 4 and the camera signal processing section 6 constitute an image acquisition section which acquires image data related to an original image representative of an image pickup result in the form of a moving image or a still image.

An image RAM (Random Access Memory) 7, under the control of the central processing unit 3, temporarily stores the image data outputted to the image bus BUS and outputs the stored image data to the image bus BUS.

A face detection section 8, under the control of the central processing unit 3, acquires the original image data recorded on the image RAM 7 and detects an area occupied by a picked-up image of a particular object from the image represented by the original image data. In the first embodiment, this particular object is set to the face of a person, and the face detection section 8 notifies the central processing unit 3 of a detection result D1.

Figure 3:
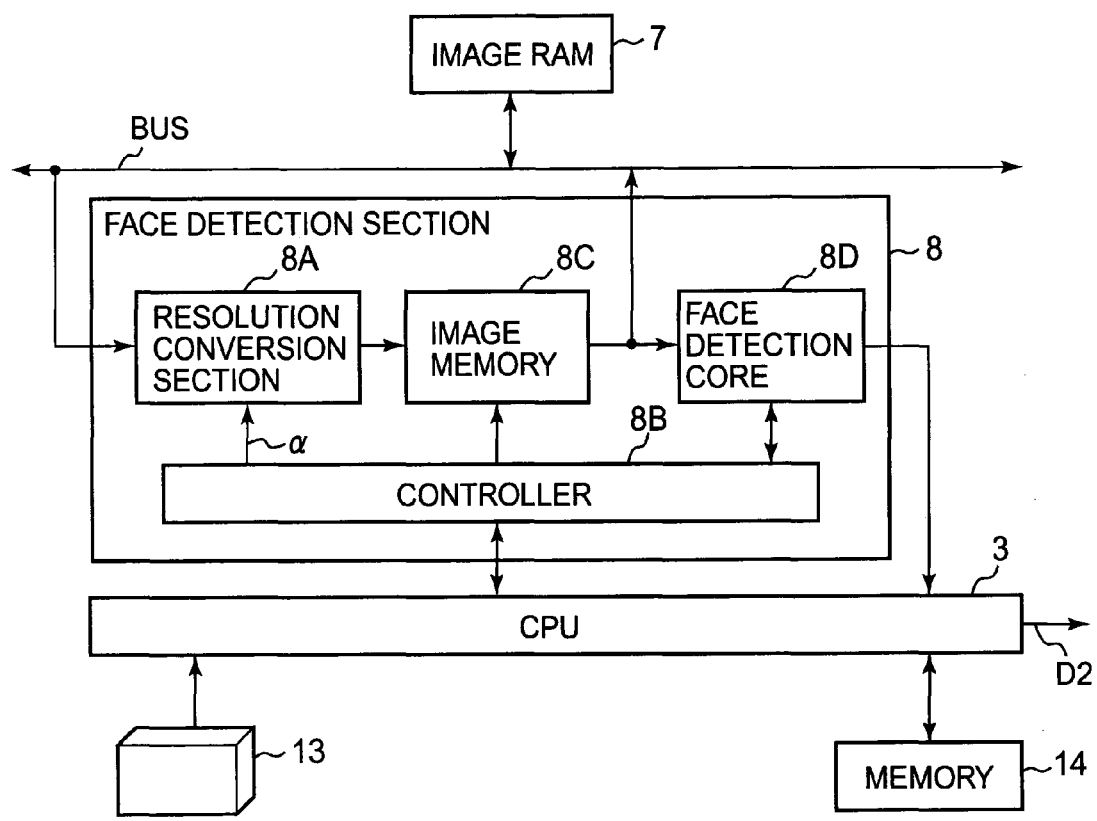
FIG. 3 is a block diagram showing a detailed construction of a face detection section in the image pickup apparatus shown in FIG. 2.

Specifically, as shown in FIG. 3, in the face detection section 8, a resolution conversion section 8A performs filtering to convert the resolution of the image data stored in the image RAM 7 according to a scale factor α designated by a controller 8B, thereby reducing the size of the image represented by the image data stored in the image RAM 7 according to the scale factor α and outputting the image of the reduced size.

An image memory 8C, under the control of the controller 8B, records and holds the image data outputted from the resolution conversion section 8A and stores the held image data into the image RAM 7 and a face detection core 8D. In this manner, the face detection section 8 reduces the size of the original image stored in the image RAM 7 according to any of various scale factors and stores an image of reduced size in the image RAM 7, and further reduces the size of the image stored in the image RAM 7 according to various scale factors and stores images of various reduced sizes, thereby generating reduced images in each of which the resolution of the original image stored in the image RAM 7 is reduced to a different extent.

The face detection core 8D detects an area occupied by a picked-up image of the face from an image represented by the image data outputted from the image memory 8C, by template matching using a template under the control of the controller 8B. Namely, the face detection core 8D temporarily records and holds the image data outputted from the image memory 8C, and sequentially selects the held image data and executes correlation value detection processing on the selected image data as well as image data which constitutes a template, thereby scanning the template on the image represented by the selected image data and detecting correlation values indicative of the extent of similarity between the target image and the template at individual scanning positions. In the first embodiment, the detection of each of the correlation values is executed by calculating the sum of absolute differences of luminance levels between overlapping pixels, but instead of this processing, it is possible to use various other techniques such as performing logical operation by representing each of a target image and a template in binary format.

The face detection core 8D makes a decision as to the correlation values detected in this manner on the basis of a predetermined threshold, thereby detecting the area occupied by the picked-up image of the face. The face detection core 8D holds in its memory a plurality of kinds of templates each of which is set to the same sampling rate in the horizontal and vertical directions and which respectively correspond to different faces, for example, an image of a face taken from the front, an image of a face taken obliquely from the front, and an image of a round face. In addition, the face detection core 8D executes a sequence of processing for detection of correlation values in a simultaneous parallel manner by using such plurality of kinds of templates each having the same size, thereby reliably detecting an area occupied by a picked-up image of a face irrespective of different objects.

In addition, the face detection core 8D, in accordance with an instruction from the controller 8B, executes the correlation value detection processing while correcting the position of the target image with respect to the plurality of kinds of templates so as to correct the position and the inclination of the image pickup apparatus 1 according to the position thereof detected by a gravity direction sensor 13 which will be described later, thereby reliably detecting an area occupied by a picked-up image of a face, even when a user changes the position of the image pickup apparatus 1 to take an image with a vertical angle of view, for example.

In addition, the face detection core 8D, in accordance with an instruction from the controller 8B, switches the start position of scanning, the order of scanning, and the end position of scanning, thereby detecting an area occupied by a picked-up image of a face in a short time with sufficient accuracy. Specifically, in many cases, if an image-taking mode in the image pickup apparatus 1 is set to, for example, a portrait mode which is an image-taking mode for taking images of persons, a picked-up image of the face of a person is located in the central section of the screen. Accordingly, in this case, the face detection core 8D, under the control of the controller 8B, starts scanning at the center of the screen and causes a template to scan helically toward the periphery of the screen, thereby detecting an area occupied by the picked-up image of the face of the person. In addition, the face detection core 8D stops scanning at the outermost periphery to reduce the time required to detect the face, thereby detecting the area occupied by the picked-up image of the face with practically sufficient accuracy. Conversely, in the case of a group photograph, it is expected that the faces of individual persons are detected at different locations of the screen. Accordingly, in this case, the face detection core 8D detects all areas occupied by picked-up images of the respective faces, by performing scanning in the order of raster scanning, for example.

In this manner, the face detection core 8D notifies the central processing unit 3 of the detection result D1 of face detection, i.e., the position of the area occupied by the picked-up image of the face that has been detected by making a decision as to the correlation values, along with the size of a template subjected to the detection of the face.

The controller 8B controls the respective operations of the resolution conversion section 8A, the image memory 8C and the face detection core 8D under the control of the central processing unit 3.

The image display section 9 includes, for example, a liquid crystal display device and the peripheral section thereof, and displays an image represented by the monitoring image data recorded on the image RAM 7, under the control of the central processing unit 3. In addition, at this time, the image display section 9, in accordance with an instruction from the central processing unit 3, displays a frame having a rectangular shape to surround the face, on the basis of the detection result from the face detection section 8.

Accordingly, the image pickup apparatus 1 is constructed so that the image data inputted through the lens 2, the image sensor 4 and the camera signal processing section 6 in the form of a moving image or a still image can be displayed on the image display section 9 for monitoring purpose so as to permit confirmation of the area occupied by the picked-up image of the face in accordance with an instruction from the user.

An image compression/decompression section 10, under the control of the central processing unit 3, acquires the image data recorded on the image RAM 7 and compresses the image data by a technique such as JPEG (Joint Photographic Coding Experts Group) or MPEG (Moving Picture Experts Group), and records image data representative of the result of the processing on an image recording medium 12 in the form of an image file. As opposed to this processing, the image compression/decompression section 10 decompresses an image file recorded on the image recording medium 12 and records image data representative of the result of the processing on the image RAM 7.

Accordingly, the image pickup apparatus 1 is constructed so that the image pickup result acquired in the form of a moving image or a still image can be recorded on the image recording medium 12 and the image data file recorded on the image recording medium 12 can be variously processed.

The image recording medium 12 is any of various recording media such as memory cards, optical disks, magnetic disks and magnetic tape, and records various data outputted from the image compression/decompression section 10 and the central processing unit 3 and outputs the recorded various data to each of the image compression/decompression section 10 and the central processing unit 3. In addition, the image recording medium 12 may be either of a removable type or a built-in type which is difficult to remove, or both of the two types.

In addition, the image compression/decompression section 10 communicates image data with external devices via a wired or wireless data communication section instead of using such a recording medium.

Accordingly, in the image pickup apparatus 1, the image compression/decompression section 10 constitutes an image acquisition section associated with a recording medium, for acquiring image data representative of an original image recorded on the recording medium, and also constitutes a data communication section which performs data communication with external devices.

Accordingly, if the user selects an image-taking mode for still images, the image pickup apparatus 1 sequentially acquires an image pickup result from the image sensor 4 in the form of a still image and performs signal processing on the image pickup result in the camera signal processing section 6, and then stores the processed image pickup result into the image RAM 7 and also causes the image display section 9 to display the image pickup result stored in the image RAM 7 in the form of a still image, so that the user can monitor an image pickup target. In addition, during this monitoring state, if the user operates a trigger switch (not shown), the image pickup apparatus 1 acquires an image pickup result in the form of a still image instead of the image pickup result that has so far picked-up in the form of a moving image, and stores the acquired image pickup result into the image RAM 7, and also causes the image display section 9 to display the image pickup result stored in the image RAM 7 in the form of a still image, so that the user can monitor the image pickup result. In addition, if the user instructs the image pickup apparatus 1 to record the image pickup result, the image pickup apparatus 1 compresses the image data stored in the image RAM 7 in the form of a still image by means of the image compression/decompression section 10, and records the compressed image data on the image recording medium 12.

Accordingly, if the user selects an image-taking mode for moving images, the image pickup apparatus 1 sequentially acquires an image pickup result from the image sensor 4 in the form of a moving image and performs signal processing on the image pickup result in the camera signal processing section 6, and then stores the processed image pickup result into the image RAM 7 and also causes the image display section 9 to display the image pickup result stored in the image RAM 7 in the form of a moving image, so that the user can monitor an image pickup target in this case as well. In addition, during this monitoring state, if the user operates the trigger switch, the image pickup apparatus 1 causes the image compression/decompression section 10 to sequentially compress the image data stored in the image RAM 7 and records the compressed image data on the image recording medium 12.

In addition, if the user instructs the image pickup apparatus 1 to reproduce an image file recorded on the image recording medium 12 in the form of a still image or a moving image, the image pickup apparatus 1 acquires image data representative of the image file from the image recording medium 12, causes the image compression/decompression section 10 to decompress the image data, and stores image data representative of the result of the processing into the image RAM 7. In addition, the image pickup apparatus 1 generates monitoring image data from the image data stored in the image RAM 7 and causes the image display section 9 to display an image represented by the monitoring image data.

The gravity direction sensor 13 includes an acceleration sensor for detecting acceleration in different directions and a signal processing section for processing a detection result outputted from the acceleration sensor and detecting the direction of gravitational acceleration, and detects the position of the image pickup apparatus 1 and notifies the central processing unit 3 of the detected position.

A memory 14 is formed by a nonvolatile memory and a volatile memory, and records a program for the central processing unit 3, data required for the processing of the central processing unit 3, and the like, and also forms a work area and the like for the central processing unit 3.

The central processing unit 3 is a control section for controlling the operation of the image pickup apparatus 1, and executes the program recorded on the memory 14 to control the operations of the respective sections in response to operation performed by the user. In the first embodiment, the program is provided in the form of being preinstalled in the image pickup apparatus 1, but may be provided in the form of being recorded on various recording media such as optical disks, magnetic disks or memory cards, instead of being preinstalled, or may also be provided by downloading from a network such as the Internet.

The central processing unit 3 executes the process sequence of this program to acquire the image pickup result in the form of a moving image or a still image in response to an instruction from the user and display the acquired image pickup result on the image display section 9, and also records the image pickup result on the image recording medium 12. At this time, the central processing unit 3 instructs the face detection section 8 to perform operation and acquires the detection result D1, and acquires image data representative of the area occupied by the picked-up image of the face on the basis of the detection result D1. On the basis of the acquired image data, the central processing unit 3 controls the aperture and the focus of the lens 2 to execute automatic aperture control and automatic focus control, and also controls white balance adjustment in the camera signal processing section 6.

Specifically, the central processing unit 3 controls the aperture of the lens 2 to maintain the area occupied by the picked-up image of the face at a given luminance level, thereby executing automatic aperture control processing. In addition, the central processing unit 3 executes aperture control processing in combination with an aperture control technique using an existing technique based on an average luminance level or the like measured across the entire screen, thereby making it possible to reliably execute aperture control even if, for example, an area occupied by a picked-up image of a face is not detected in a picked-up image of a landscape.

In addition, on the basis of the size of the area occupied by the picked-up image of the face, the central processing unit 3 estimates the distance to a person having the face whose image is picked-up, and executes focus control on the basis of the distance. In this case as well, the central processing unit 3 executes focus control processing in combination with focus control using an existing technique such as a so-called hill-climbing method of consistently performing variable control on focus in the direction in which the signal levels of high-frequency components increase, thereby making it possible to reliably execute focus control even if an area occupied by a picked-up image of a face is not detected.

In addition, the central processing unit 3 corrects the gain of each color signal and adjusts white balance so that the hue of the area occupied by the picked-up image of the face becomes equal to the hue of skin color having a fixed value. In this case as well, the central processing unit 3 executes white balance adjustment in combination with an existing technique, thereby making it possible to reliably execute white balance adjustment even if an area occupied by a picked-up image of a face is not detected. In addition, as to the combinations with the existing techniques, it is possible to use a wide range of combinations of existing techniques such as a method of applying an existing technique only when an area occupied by a picked-up image of a face is not detected as an area larger than a given area, and a method of performing weighting addition on controlled variables including a controlled variable based on an existing technique by using a weighting coefficient based on the area or the like of the area occupied by the picked-up image of the face.

In addition, if the user inputs an instruction to display the area on the basis of which the above-mentioned automatic aperture control, automatic focus control and white balance adjustment have been performed, the central processing unit 3 instructs the image display section 9 to display a frame surrounding the face. In addition, on the basis of the settings of an operation mode defined by the user in advance, the central processing unit 3 records the detection result D1 of the face detection section 8 on the image recording medium 12 as image-annexed information D2 attached to a corresponding image file or as a separate file associated with the corresponding image file.

In addition, if the user inputs an instruction to display an image file recorded on the image recording medium 12 for monitoring purpose, the central processing unit 3 instructs each section to cause the image display section 9 to display the image file recorded on the image recording medium 12. At this time, if the user inputs an instruction to display a frame surrounding the face, the central processing unit 3 instructs the image display section 9 to display the frame surrounding the face on the basis of the image-annexed information D2 recorded on the image recording medium 12, in the case where the image-annexed information D2 of the image file is recorded on the image recording medium 12.

In addition, if the image-annexed information D2 is not recorded on the image recording medium 12 when the user inputs an instruction to display a frame surrounding the face, the central processing unit 3 instructs the face detection section 8 to start the operation of processing the image data reproduced from the image recording medium 12 and recorded on the image RAM 7, and acquires a detection result D1 corresponding to the area occupied by the picked-up image of the face. In addition, the central processing unit 3 instructs the image display section 9 to display a frame surrounding the face on the basis of the acquired detection result D1.

In addition, when the image file recorded on the image recording medium 12 is reproduced and the user inputs an instruction to perform image correction based on the person, the central processing unit 3 corrects the luminance level and the hue of the image data stored in the image RAM 7, on the basis of the area occupied by the picked-up image of the face, in a manner similar to automatic focus and white balance adjustment performed during image taking, and displays the corrected image date on the image display section 9. In addition, in accordance with an instruction from the user, the central processing unit 3 records an image file corrected for luminance level and hue in the above-mentioned manner on the image recording medium 12. The correction of luminance level and hue may be executed by transmitting the image data to the camera signal processing section 6 and subjecting the image data to the processing of the camera signal processing section 6, or instead of using this process may be executed by processing the image data in the central processing unit 3.

Accordingly, the image pickup apparatus 1 variously controls the operation of each of the image pickup system and the signal processing system on the basis of the area occupied by a picked-up image of a particular object, that is detected by the face detection section 8.

Figure 4:
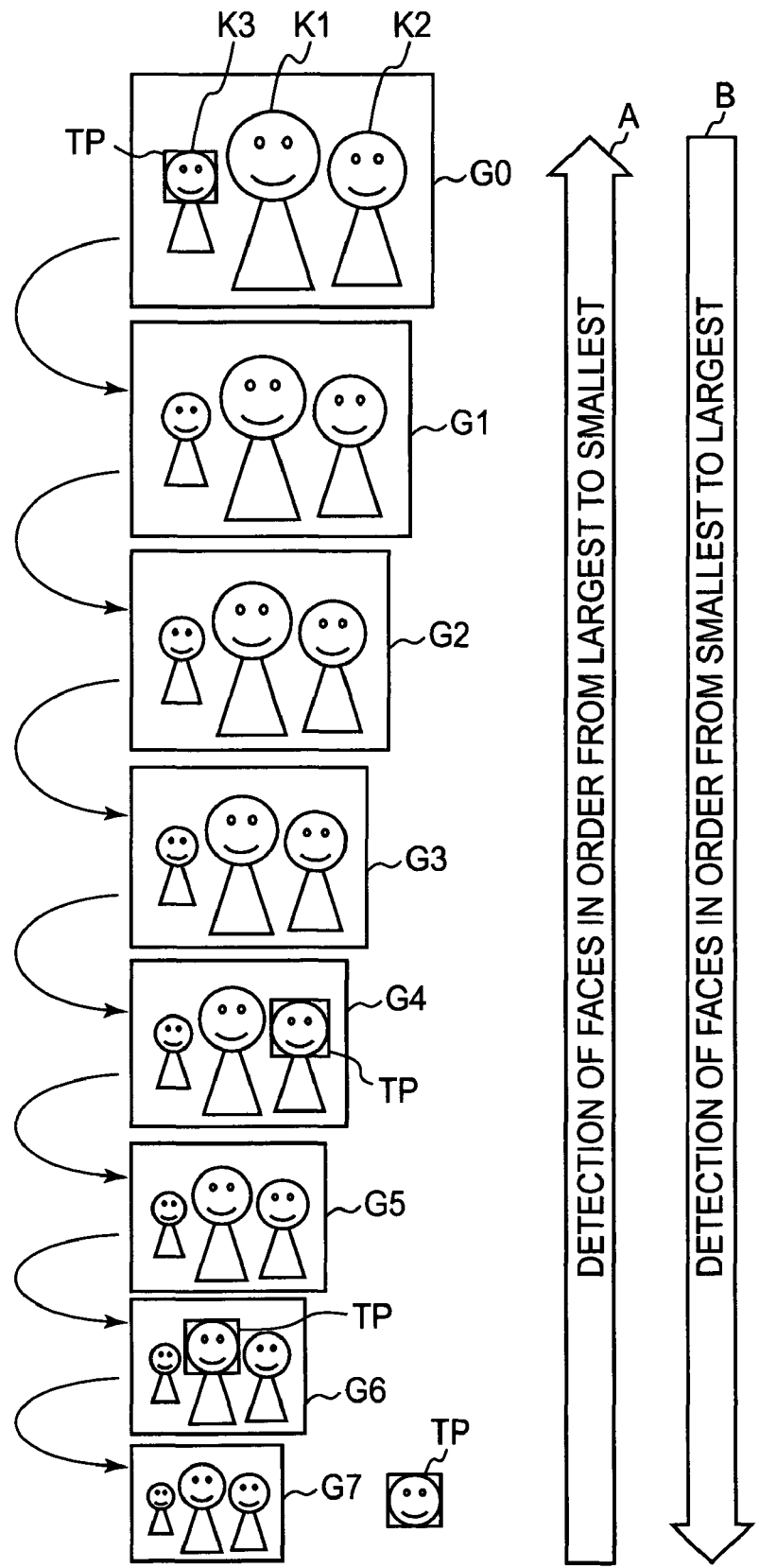
FIG. 4 is a schematic diagram aiding in explaining the processing of the central processing unit in the image pickup apparatus according to the first embodiment of the present invention.

FIG. 4 is a schematic diagram aiding in explaining the process sequence of the central processing unit 3 responsible for the processing of detecting the area occupied by a picked-up image of a particular object by means of the face detection section 8. In the first embodiment, the central processing unit 3 detects an area occupied by a picked-up image of a face by sequentially varying on a step-by-step basis the size of an image of a target to be processed, with respect to a template TP of single size, thereby detecting at high speed an area occupied by a picked-up image of a particular object and appropriately setting the priority order.

Specifically, if an image is picked-up in an image-taking mode such as the portrait mode or a self-portrait mode for taking an image of the user himself/herself, a short-range view of a small number of persons tends to be picked-up so that the face of a larger object occupies a larger area in the image pickup result. Accordingly, in the example shown in FIG. 4, in an original image G0 represented by original image data stored in the image RAM 7, it is determined that the main object is a person whose face K1 is picked-up as the largest face and persons whose faces K2 and K3 are picked-up as smaller faces than the face K1 are persons concerned who are to be given a lower priority order.

Accordingly, in this case, by comparing the image of the processing target with a template while sequentially varying the size of the image on a step-by-step basis so as to first detect the largest face K1 and then sequentially detect the faces K2 and K3 picked-up as smaller faces than the face K1, it is possible to sequentially detect areas occupied by the respective faces, in order from the main person. In addition, in this case, even if the process is stopped at a given stage after the face of the main person has been detected, it is possible to detect areas respectively occupied by picked-up images of faces within a practically sufficient accuracy for the processing to be performed in the image pickup apparatus 1.

Specifically, in the example shown in FIG. 4, the resolution of the original image G0 represented by the original image data is sequentially reduced on a step-by-step basis to generate reduced images G7, G6, G5, . . . , G1, and the areas occupied by the picked-up images of the respective faces are detected in each of the reduced images G7, G6, G5, . . . , G1 and the original image G0 by template matching using the template TP, so that the faces K1 and K2 are respectively detected in the reduced images G6 and G4 and the face K3 is detected in the original image G0. Accordingly, in this case, in order that the areas be sequentially detected in order from the largest picked-up face, as indicated by an arrow A, the areas occupied by the picked-up images of the respective faces are first detected in the reduced image G7 representing the original image on the most reduced scale, and then the areas occupied by the picked-up images of the respective faces in each of the other images are sequentially detected while the sizes of the respective images to be processed are being sequentially enlarged on a step-by-step basis toward the size of the original image G0. In this manner, the areas occupied by the picked-up images of the respective faces can be detected in the priority order of detection.

As opposed to this processing, if picked-up images of a larger number of persons are contained in a group photograph, the larger the number of picked-up persons, unnecessary template matching will be executed on images reduced to the greater extent. For this reason, in this case, as indicated by an arrow B, the areas occupied by the picked-up images of the respective faces are sequentially detected while the images to be processed are being sequentially reduced on a step-by-step basis, so that the areas occupied by the picked-up images of the respective faces can be detected in a short time after the start of the processing.

In addition, there is a case where a face is not contained in an image picked-up in a landscape mode or the like, and even if a face is contained in the image, the area occupied by a picked-up image of the face is extremely small in many cases such as a distant view of a person against the background of a landscape and a picked-up image of the face of a passerby. In such a case as well, it is estimated that the presence of a large face which occupies the entire screen is a very rare case. Accordingly, in this case, faces are sequentially detected on a step-by-step basis in order from the smallest to the largest areas, and even if the detection processing of the areas occupied by the picked-up images of the respective faces is stopped during the sequence of the processing, the areas occupied by the picked-up images of the respective faces can be detected with practically sufficient accuracy.

Figure 1:
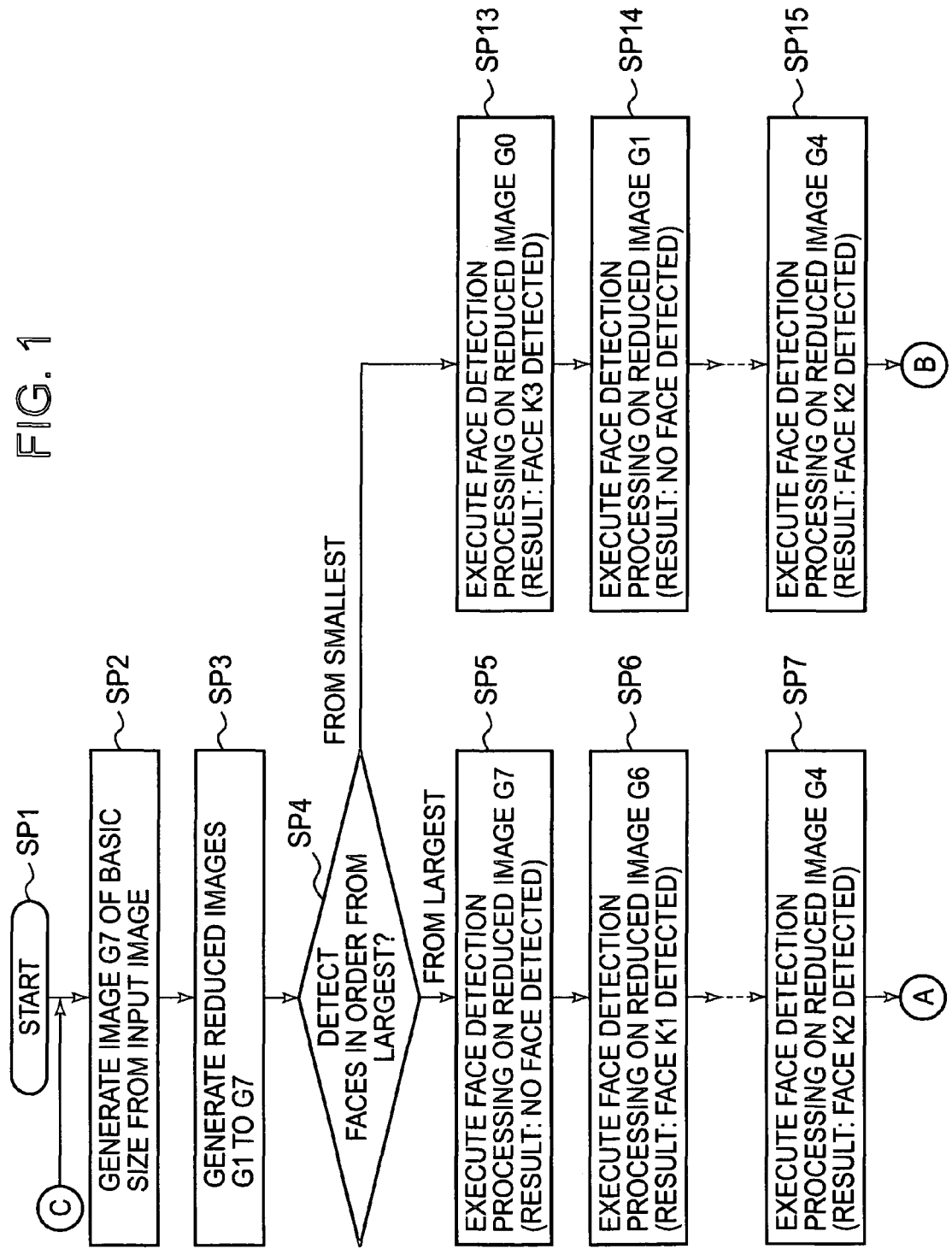
FIG. 1 is a flowchart showing the process sequence of a central processing unit in an image pickup apparatus according to a first embodiment of the present invention.
Figure 5:
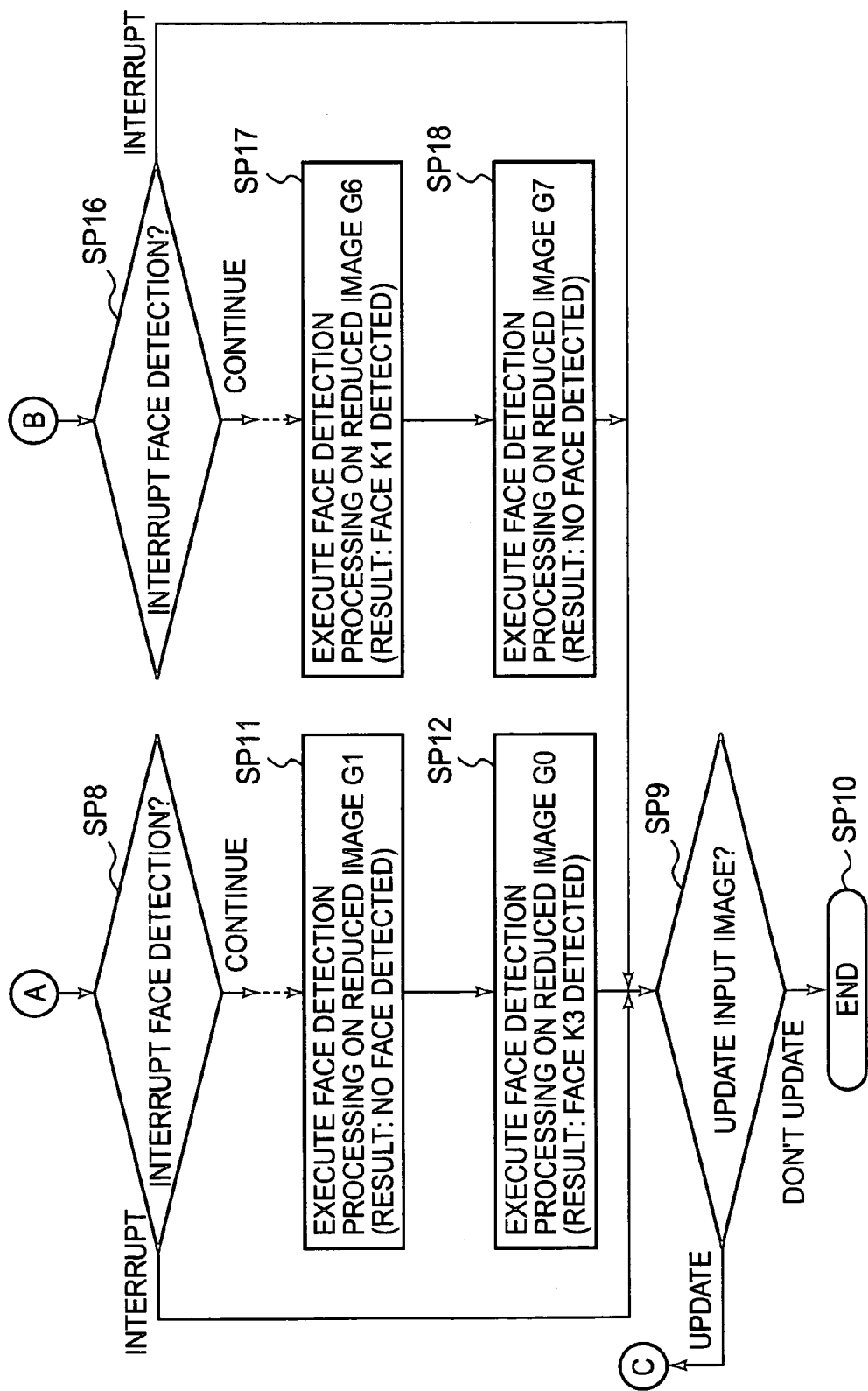
FIG. 5 is a flowchart showing a continuation of FIG. 1.
Figure 6:
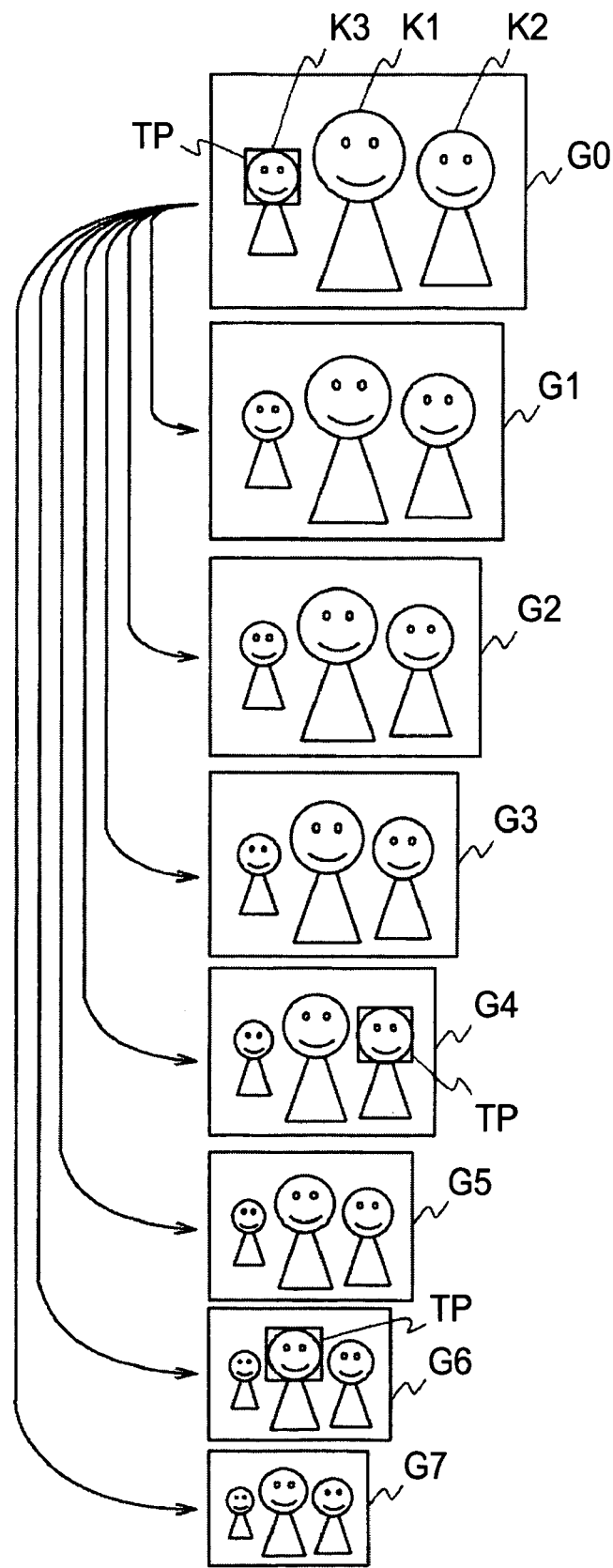
FIG. 6 is a schematic diagram aiding in explaining the generation processing of reduced images.

In this manner, the central processing unit 3 executes the process sequence shown in FIGS. 1 and 5 and detects the areas occupied by the picked-up images of the respective faces while sequentially varying the size of the target image on a step-by-step basis. Referring to FIG. 1, when the central processing unit 3 starts the process sequence, the process proceeds from step SP1 to step SP2, in which the central processing unit 3 generates image data representative of the original image G0 and stores the image data in the image RAM 7 under the control of the camera signal processing section 6. In step SP3, the central processing unit 3 controls the operations of the resolution conversion section 8A and the image memory 8C by means of the controller 8B provided in the face detection section 8, and sequentially switches the scale factor α as shown in FIG. 6 to convert the resolution of the image data representative of the original image G0 stored in the image RAM 7 and store the converted image data in the image RAM 7, thereby storing image data representative of the reduced images G1 to G7 in the image RAM 7. In this case, as indicated by the arrow B in FIG. 4, the reduced images may be sequentially reduced at a given scale factor to generate a plurality of reduced images G1 to G7 having different resolutions.

Then, in step SP4, the central processing unit 3 determines whether the areas occupied by the picked-up images of the respective faces are to be detected in order from the largest face or in order from the smallest face. The central processing unit 3 executes the decision processing of step SP4 on the basis of the image-taking mode and on the basis of a result of processing of so-far continuing frames which are the past detection result of the face detection core 8D. Specifically, if the image-taking mode of the image pickup apparatus 1 is set to an image-taking mode, such as the portrait mode or the self-portrait mode, which can be predicted to be used to take an image of a short-range view of a small number of persons, the central processing unit 3 determines so as to detect the areas occupied by the picked-up images of the respective faces in order from the largest face. In addition, even if the central processing unit 3 cannot determine owing to such an image-taking mode, if an image in which the faces of one to several persons are picked-up with comparatively large areas continues by several frames, the central processing unit 3 determines so as to detect the areas occupied by the picked-up images of the respective faces in order from the largest face.

As opposed to this processing, if the image-taking mode of the image pickup apparatus 1 is set to an image-taking mode, such as the landscape mode, which can be predicted to be used to take an image of a multiplicity of persons having comparatively small areas, the central processing unit 3 determines so as to detect the areas occupied by the picked-up images of the respective faces in order from the smallest face. In addition, even if the central processing unit 3 cannot determine owing to such an image-taking mode, if an image in which a multiplicity of faces are picked-up with comparatively small areas continues by several frames, the central processing unit 3 determines so as to detect the areas occupied by the picked-up images of the respective faces in order from the smallest face.

If the central processing unit 3 cannot determine in step SP4 in which order to detect the areas occupied by the picked-up images of the respective faces, the central processing unit 3 performs face detection in either of the orders in accordance with initial settings, and in the first embodiment, the initial settings are set to face detection to be performed in order from the largest face. These initial settings may also use the history of use of the image pickup apparatus 1, the settings of the user, and the like.

If the central processing unit 3 determines in step SP4 that the areas occupied by the picked-up images of the respective faces are to be detected in order from the largest order, the process proceeds from step SP4 to step SP5, in which the central processing unit 3 loads the image data representative of the reduced image G7 stored in the image RAM 7 into the image memory 8C and transmits the loaded image data to the face detection core 8D to set the smallest reduced image G7 to a target image to be processed, and the face detection core 8D detects the areas occupied by the picked-up images of the respective faces by template matching. Thus, in the example shown in FIG. 4, the areas occupied by the picked-up images of the respective faces are not detected in the reduced image G7.

Then, in step SP6, the central processing unit 3 sets the reduced image G6 one step larger than the reduced image G7 to a target image to be processed and executes similar processing, and detects the face K1 in the example shown in FIG. 4. In addition, the central processing unit 3 sequentially repeats this processing to detect the areas occupied by the picked-up images of the respective faces by template matching using the reduced images G1 to G7 and the original image G0. In addition, in this processing, the central processing unit 3 designates the order of scanning, the start position of scanning and the like in the face detection core 8D according to the image-taking mode.

The central processing unit 3 sequentially executes the processing of face detection on a step-by-step basis by using the reduced images G1 to G7 and the original image G0, and determines whether the process is to be stopped at a given processing stage. Accordingly, in the processing shown in FIG. 1, when the central processing unit 3 processes the reduced image G6 in step SP7, the central processing unit 3 determines in step SP8 whether the process is to be stopped. In addition, the processing of determining whether to stop the process may be executed at each stage, and may also be executed at a stage based on settings or the like defined by the user.

In step SP8, the central processing unit 3 determines whether the process is to be stopped according to the past detection result and the image-taking mode. Specifically, if an area occupied by a picked-up image of a face, which area corresponds to a frame surrounding the face which is to be displayed on the image display section 9, is already detected in the processing that has so far been performed, the central processing unit 3 determines that the process is to be stopped. In addition, if the image-taking mode is set to, for example, the portrait mode or the self-portrait mode, the central processing unit 3 determines that the process is to be stopped at a stage corresponding to the set image-taking mode. In addition, the central processing unit 3 may also determine whether to stop the process, on the basis of settings defined by the user.

Accordingly, the central processing unit 3 proceeds from step SP8 to step SP9 and stops the processing of template matching using the remaining reduced images G3 to G1 and the original image G0. Then, the central processing unit 3 switches a reduced image to be subjected to the processing of template matching, on the basis of the past detection result and in accordance with the image-taking mode of an image pickup section. In addition, during the switching of the target image according to the image-taking mode, the switching of a reduced image at which to start the process may be executed instead of or in addition to the switching of a reduced image at which to end the process.

The central processing unit 3 determines in step SP9 whether an image of the subsequent frame has been acquired, and if it is determined in step SP9 that an image of the subsequent frame has been acquired, the central processing unit 3 returns to step SP2 and repeats the processing. If it is determined in step SP9 that an image of the subsequent frame has not yet been acquired, the central processing unit 3 proceeds from step SP9 to step SP10 and ends the process sequence.

Conversely, if the result is negative in step SP8, the central processing unit 3 sequentially executes the processing of template matching by using the remaining reduced images G3 to G1 and the original image G0, and proceeds to step SP9.

As opposed to this processing, if the central processing unit 3 determines in step SP4 that the areas occupied by the picked-up images of the respective faces are to be detected in order from the smallest order, the process proceeds from step SP4 to step SP13, in which the central processing unit 3 loads the image data representative of the original image G0 stored in the image RAM 7 into the image memory 8C and transmits the loaded image data to the face detection core 8D to set the largest original image G0 to a target image to be processed, and the face detection core 8D detects the areas occupied by the picked-up images of the respective faces by template matching. Thus, in the example shown in FIG. 4, the smallest face K3 is detected in the original image G0.

Then, in step SP14, the central processing unit 3 sets the reduced image G1 one step smaller than the original image G0 to a target image to be processed and executes similar processing, and sequentially repeats this processing to detect the areas occupied by the picked-up images of the respective faces by template matching using the reduced images G1 to G7 and the original image G0 in order from the smallest image. In addition, in this processing as well, the central processing unit 3 designates the order of scanning, the start position of scanning and the like in the face detection core 8D according to the image-taking mode and the like.

The central processing unit 3 sequentially executes the processing of face detection on a step-by-step basis in order from the smallest image by using the reduced images G1 to G7 and the original image G0, and determines whether the process is to be stopped at a given processing stage. Accordingly, in the processing shown in FIG. 5, when the central processing unit 3 processes the reduced image G4 in step SP15, the central processing unit 3 determines in step SP16 whether the process is to be stopped. In addition, the processing of determining whether to stop the process may be executed at each stage, and may also be executed at a stage based on settings or the like defined by the user.

In step SP15, the central processing unit 3 determines whether the process is to be stopped according to the past detection result. Specifically, for example, if an area occupied by a picked-up image of a face cannot be detected during several successive steps after an area occupied by a picked-up image of a face has been detected at the past stage, and furthermore if an area occupied by an image of a face picked-up at a later stage is not yet detected during the past successive frames, the central processing unit 3 determines that the process is to be stopped. In addition, the central processing unit 3 may be adapted to stop the process after a given stage during the landscape mode, for example. Accordingly, the central processing unit 3 may be adapted to determine whether to stop the process, according to the image-taking mode, and may also be adapted to determine whether to stop the process, on the basis of settings defined by the user.

Accordingly, in this case, the central processing unit 3 proceeds from step SP16 to step SP9 and stops the processing of template matching using the remaining reduced images G5 to G7. In addition, in step SP9, the central processing unit 3 determines whether an image of the subsequent frame has been acquired, and if it is determined in step SP9 that an image of the subsequent frame has been acquired, the central processing unit 3 returns to step SP2 and repeats the processing. Conversely, if it is determined in step SP9 that an image of the subsequent frame has not yet been acquired, the central processing unit 3 proceeds from step SP9 to step SP10 and ends the process. Accordingly, in this case as well, the central processing unit 3 switches a reduced image to be subjected to the processing of template matching, on the basis of the past detection result and furthermore in accordance with the image-taking mode of the image pickup section. In this case as well, the target image to be processed may be switched by the switching of a reduced image at which to start the process, instead of or in addition to the switching of a reduced image at which to end the process.

Conversely, if the result is negative in step SP16, the central processing unit 3 sequentially executes the processing of template matching by using the remaining reduced images G5 to G7, and proceeds to step SP9.

In addition, instead of preparing in advance a plurality of kinds of reduced images having different sizes and storing them in the image RAM 7 so that the processing of template matching is executed at each stage, it is also preferable to adopt a construction in which each time the processing of template matching is to be executed at an individual stage, a reduced image having a corresponding size is prepared. According to this construction, it is possible to omit the processing of preparing unnecessary reduced images, and furthermore, since it is possible to omit the processing of writing image data related to reduced images into the image RAM 7, the time required for the processing can be reduced by that amount. In addition, in this case, instead of reducing an original image, it is also possible to reduce a reduced image used at the preceding stage and generate a reduced image to be processed at the succeeding stage.

In this manner, the central processing unit 3 sequentially detects on a step-by-step basis the areas occupied by the picked-up images of the respective faces and acquires the face detection result D1 from the face detection core 8D on the basis of position information on the areas occupied by the picked-up images of the respective faces.

Figure 7A:
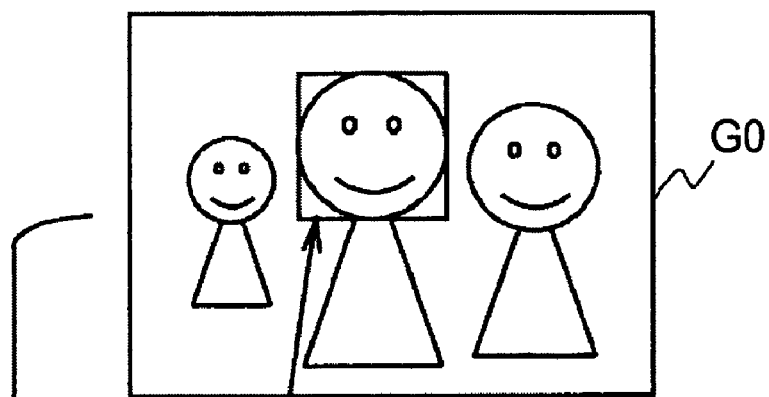
FIG. 7 is a schematic diagram aiding in explaining the processing of detection results.
Figure 7B:
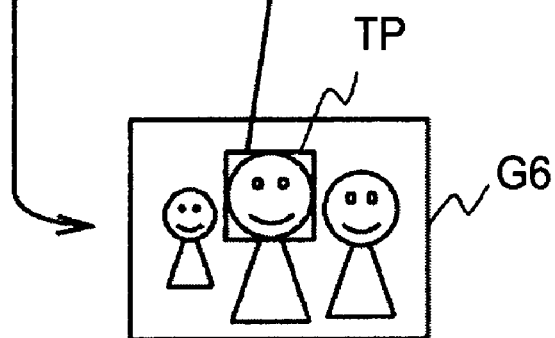

As shown in FIG. 7, the central processing unit 3 divides the size of the template TP by the scale factor α of the reduced image G6 subjected to the face detection and enlarges the size of the template TP by the scale factor α, and calculates the area occupied by the picked-up image of the face on the original image G0 from the enlarged size and position information corresponding to the face detection result D1. Then, the central processing unit 3 corrects the face detection result D1 using the template TP of single size. In addition, on the basis of the corrected face detection result D1, the central processing unit 3 instructs the image display section 9 to display a frame surrounding the face. The central processing unit 3 also generates the image-annexed information D2 on the basis of the corrected face detection result D1.

In addition, on the face detection result D1 corrected in this manner, the central processing unit 3 acquires image data representative of the area occupied by the picked-up image of the face and executes the processing of aperture control, focus control and white balance adjustment. At this time, the central processing unit 3 sets the priority order on the basis of the detection order, and executes the processing of aperture control, focus control and white balance adjustment on the basis of the largest picked-up face when the areas occupied by the picked-up images of the respective faces are detected in accordance with this priority order, for example, in order from the largest face. At this time, if an area occupied by a picked-up image of another face is also detected, the central processing unit 3 executes the processing of aperture control, focus control and white balance adjustment with reference to the luminance level, the size and the like of that area. The processing includes, for example, the processing of performing weighting addition on controlled variables found from the respective areas to calculate a final controlled variable, and executing processing such as aperture control on the basis of the final controlled variable.

(2) Operation of the First Embodiment

In the image pickup apparatus 1 (FIG. 2) having the above-mentioned construction, an image pickup result is acquired by the image sensor 4 in the form of a moving image or a still image and is variously corrected by the camera signal processing section 6, and the corrected image pickup result is stored in the image RAM 7. The image pickup result stored in the image RAM 7 is subjected to monitoring on the image display section 9, and is compressed by the image compression/decompression section 10 and recorded on the image recording medium 12, in accordance with an instruction from the user. Otherwise, the image pickup result may be outputted to external devices via an input/output terminal.

During this processing, in the image pickup apparatus 1, monitoring image data is generated by resolution conversion processing in the camera signal processing section 6, and the monitoring image data is used to monitor the image pickup result on the image display section 9. The monitoring image data is also set to image data representative of an original image to be subjected to face detection, and is inputted to the resolution conversion section 8A of the face detection section 8 (FIG. 3), in which the resolution of the input image data is reduced by a predetermined value to generate image data representative of a reduced image. This image data representative of the reduced image is stored into the image RAM 7 via the image memory 8C. In the image pickup apparatus 1, the processing by the resolution conversion section 8A and the image memory 8C is repeated, so that image data representative of a plurality of reduced images which have been sequentially reduced in resolution with respect to the original image on a step-by-step basis are stored in the image RAM 7.

In the image pickup apparatus 1, image data representative of a plurality of reduced images are generated in this manner in advance and stored in the image RAM 7, and the image data are sequentially transmitted to the image core 8D. The image data are processed by template matching using a template, so that an area occupied by a picked-up image of a particular object corresponding to the template is detected in the reduced image. In the image pickup apparatus 1, the particular object is set to the face of a person, and in the image core 8D the plurality of reduced images are processed in an order in which their resolution varies sequentially on a step-by-step basis. Accordingly, the areas occupied by the picked-up images of the respective particular objects are detected in order from the largest object or in order from the smallest object, so that the priority order can be set on the basis of the order of detection. In addition, the process can be stopped as needed to detect an objective area in a short time, so that the areas occupied by the picked-up images of the respective faces can be detected at high speed to appropriately set the priority order.

In addition, since the reduced images are processed by template matching while the resolution is being sequentially varied on a step-by-step basis in the above-mentioned manner, the areas of various sizes occupied by the picked-up images of the respective faces can be detected by using a template of single size, so that the construction of the image pickup apparatus 1 can be made simple by that amount.

In the image pickup apparatus 1, the image data related to targets to be processed are image data acquired by the image sensor 4, which serves as an image pickup section, and the camera signal processing section 6, and aperture control, focus control and white balance adjustment are executed on the basis of the areas occupied by the picked-up images of the respective faces detected in this manner, so that the areas occupied by the picked-up images of the respective particular objects can be detected at high speed to appropriately set the priority order. Accordingly, while the processing of aperture control, focus control and white balance adjustment is being accurately executed on an object desired by the user, individual images of successive frames can be processed in a short time and this processing can be reliably executed.

In addition, image data acquired from the image recording medium 12 and image data acquired from the data communication section can be displayed on the image display section 9 in the same manner as targets to be processed, and furthermore, these image data can be variously corrected and reliably processed.

In addition, the order of processing of the reduced images is switched according to the image-taking mode and the past detection result, so that unnecessary processing can be reduced and an area occupied by a picked-up image of a predetermined object can be detected in a short time.

Specifically, if it is estimated that a short-range view of persons has been picked-up, reduced images having different resolutions are sequentially processed on a step-by-step basis to detect their faces in order from largest, so that the area occupied by a picked-up image of a face which is a desired object can be detected in a short time. Conversely, if it is estimated that a group photograph or the like of persons has been picked-up, reduced images having different resolutions are sequentially processed on a step-by-step basis to detect their faces in order from smallest, so that the area occupied by a picked-up image of a face which is a desired object can be detected in a short time.

In addition, in the case where the reduced images are sequentially processed in this manner, the processing of unnecessary reduced images can be omitted by stopping the process halfway according to the image-taking mode and the past detection result and furthermore changing the start of the process to switch reduced images to be subjected to the process. Accordingly, it is possible to detect in a short time the area occupied by a face which is a desired object.

Accordingly, in the image pickup apparatus 1, the area occupied by a picked-up image of a face which is a desired object is detected in each of the reduced images, and the size of the template is converted to the size on the original image according to the size of each reduced image with respect to the original image and the area occupied by the picked-up image of the particular object is detected on the original image. In addition, processing such as aperture control is executed according to the size detected on the original image.

During this processing, in the image pickup apparatus 1, the priority order is set in accordance with the order of detection and the detection result of face detection is processed, so that processing such as focus control can be reliably executed by simple processing.

(3) Advantage of the First Embodiment

According to the above-mentioned construction, reduced images are sequentially subjected to template matching in an order in which their resolution varies sequentially on a step-by-step basis, thereby detecting the areas respectively occupied by picked-up images of particular objects. Accordingly, the areas respectively occupied by picked-up images of particular objects can be detected at high speed and the priority order can be appropriately set.

In addition, the image acquisition section that acquires target images to be processed is an image pickup section, so that if the first embodiment is applied to image pickup equipment, the usefulness of image pickup apparatus can be improved by effectively using detection results in focus control, aperture control, white balance adjustment and the like.

In addition, since the image acquisition section is an image pickup section related to recording media or has a construction related to data communication with external devices, the usefulness of image pickup apparatus can be improved by effectively using detection results in monitoring and the like of an image pickup result recorded on a recording medium.

At this time, the reduced images are processed in an order in which their resolution sequentially increases or in an order in which their resolution sequentially decreases, so that when an image of a short-range view or a distant view of a desired object is picked-up, the area occupied by the picked-up image of the desired object can be detected in a short time.

As mentioned above, an area occupied by a picked-up image of a face which is a desired object is detected in each reduced image, and the size of the template is converted to the size on the original image according to the size of each reduced image with respect to the original image and an area occupied by a picked-up image of a particular object is detected on the original image. Accordingly, various control and processing can be executed on the basis of the area occupied by the picked-up image of the particular object, which area is detected on the original image.

In addition, areas respectively occupied by picked-up images of particular objects are detected in each of reduced images whose resolution is set sequentially on a step-by-step basis, and the priority order of the areas occupied by the picked-up images of the particular objects is set in accordance with the order of detection. Accordingly, the priority order can be set simply and highly accurately, so that control and processing can be variously executed on the basis of the priority order.

In addition, the order of processing of a plurality of reduced images is switched on the basis of the past detection result and furthermore in accordance with the image-taking mode, so that an area occupied by a picked-up image of a particular object can be detected in a short time after the start of processing.

In addition, reduced images to be processed are switched on the basis of the past detection result and furthermore in accordance with the image-taking mode, so that unnecessary processing of reduced images can be omitted to reduce the time required for processing to a further extent.

A second embodiment of the present invention will be described below.

Figure 8:
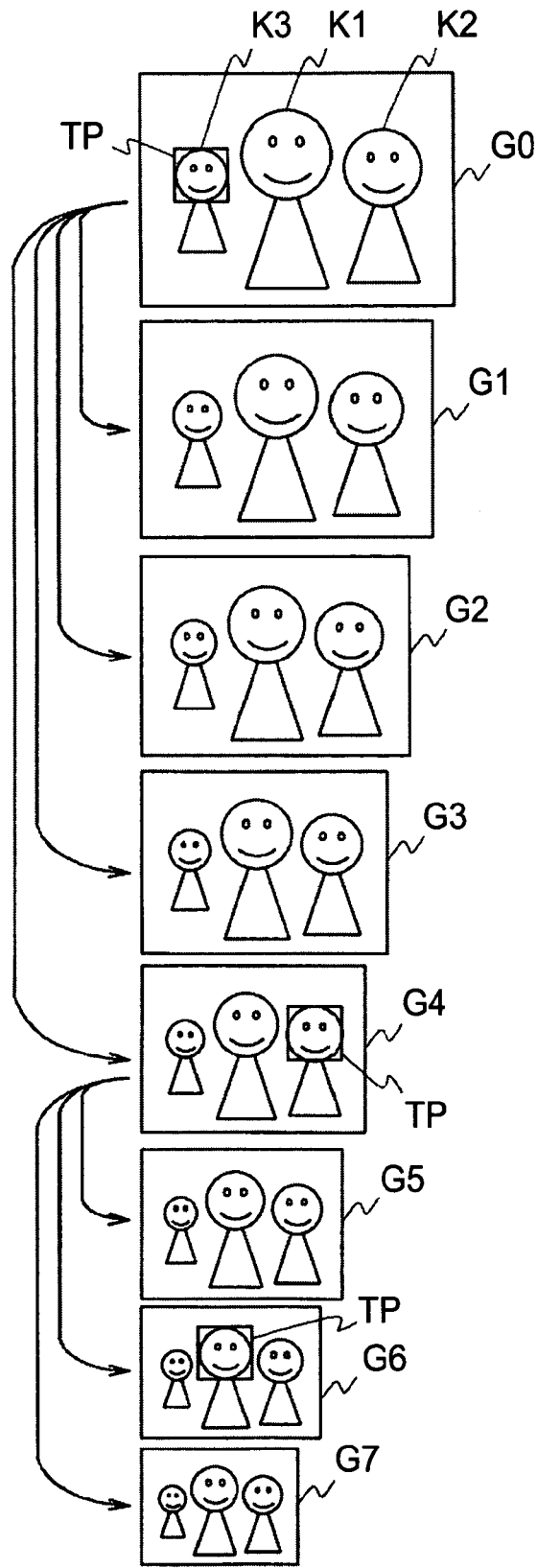
FIG. 8 is a schematic diagram aiding in explaining the generation processing of reduced images in the image pickup apparatus according to the first embodiment of the present invention.

FIG. 8 is a schematic diagram aiding in explaining, in comparison with FIGS. 4 and 6, processing to be executed by an image pickup apparatus according to the second embodiment of the present invention. In the second embodiment, the reduced image G4 to be used as a reference for intermediate processing is generated and the reduced images G5 to G7 lower in resolution than the reduced image G4 are generated by converting the resolution of the reference reduced image G4, instead of by the resolution conversion processing of an original image in which the scale factor is sequentially switched on a step-by-step basis or instead of by the sequential step-by-step resolution conversion processing of an original image in which the scale factor is maintained at a constant value. In addition, the reduced images G1 to G3 larger in resolution than the reduced image G4 are generated by converting the resolution of the original image G0.

According to the second embodiment, a reduced image to be used as a reference for intermediate processing is generated and reduced images are generated from the reference reduced image and an original image, so that the access efficiency of a memory which records and holds these reduced images is improved and, furthermore, the address control of the memory can be made simple.

A third embodiment of the present invention will be described below.

Figure 9:
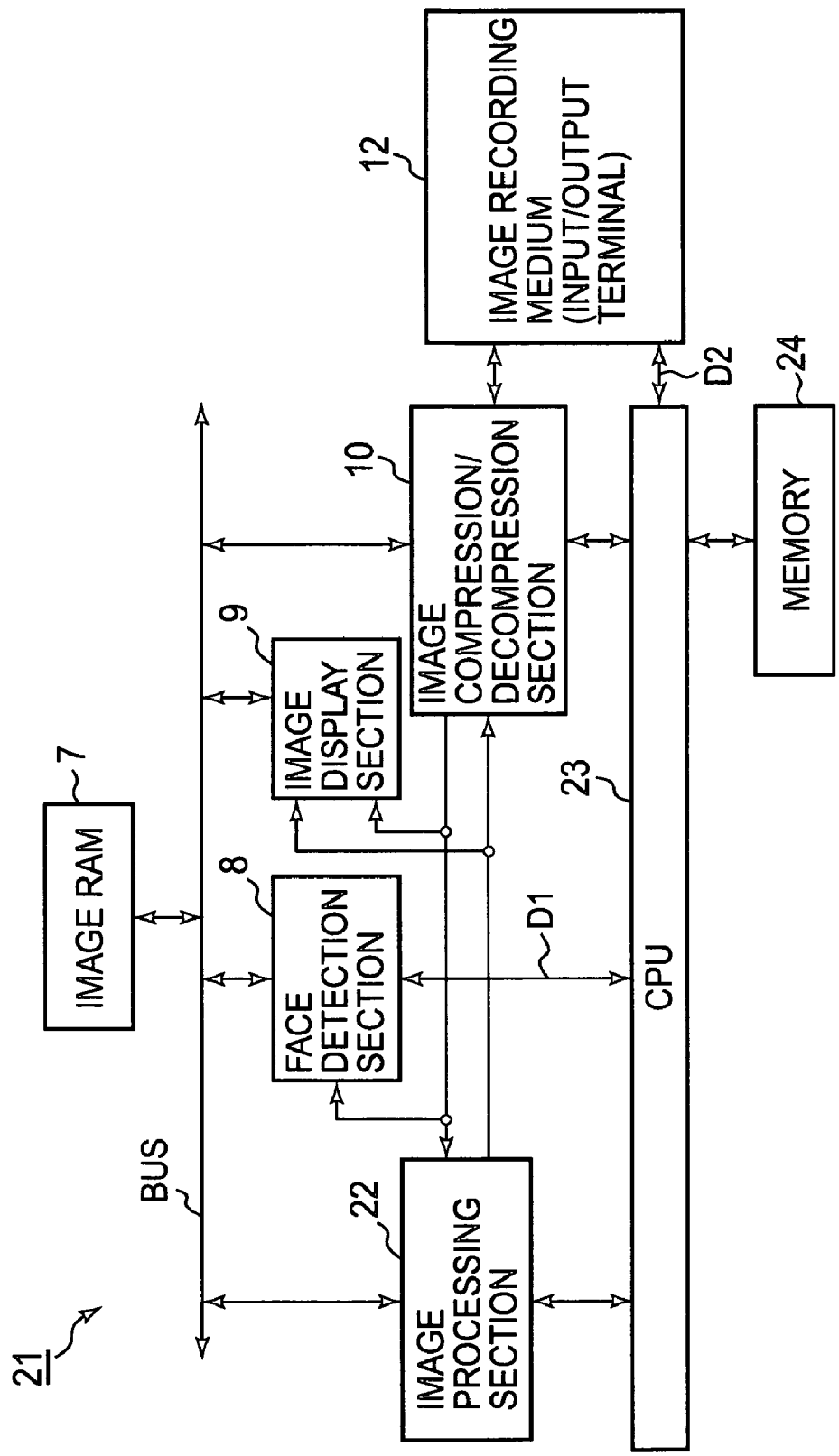
FIG. 9 is a block diagram showing a recording and apparatus according to a second embodiment of the present invention.

FIG. 9 is a block diagram showing a recording and reproducing apparatus according to the third embodiment of the present invention. A recording and reproducing apparatus 21 is, for example, a DVD (Digital Versatile Disk) recorder which processes video content obtained from a tuner, which is not shown, by an image processing section 22 and then records the processed video content on the recording medium 12 using an optical disk. In the recording and reproducing apparatus 21, identical reference numerals are used to denote the same constituent elements as the corresponding ones used in the image pickup apparatus 1 mentioned above in connection with the first embodiment, and repetition of the same description is omitted.

A central processing unit 23 controls the operations of the respective sections to control the operation of the recording and reproducing apparatus 21, by executing a processing program recorded on a memory 14. In this sequence of control, if a user gives an instruction to detect a particular object, an area occupied by a picked-up image of the particular object is detected by the face detection section 8 and the detection result is displayed on the image display section 9. Incidentally, the particular object is, for example, a favorite actor of the user.

Even in the case of the third embodiment which is applied to process various video contents in a recording and reproducing apparatus, it is possible to obtain an advantage similar to that of the first embodiment.

A fourth embodiment of the present invention will be described below.

In the above description of the first embodiment, reference has been made to the case where aperture control is performed so that a luminance level is maintained at a predetermined value in an area occupied by a picked-up image of a face of the highest priority order, as well as to the case where the processing of aperture control is executed with a final control variable based on weighting addition of the area and an area occupied by a picked-up image of another face. However, the present invention is not limited to either of these cases, and the aperture and the charge storage time of an image pickup apparatus are controlled so that the luminance level is maintained at a predetermined value and, at the same time, the depth of field is controlled. In this case, even if the distances to various objects differ from one another, the depth of field can be set to prevent defocusing within the range of these different distances, thereby improving the usefulness of the apparatus to a further extent.

The above description of any of the first to fourth embodiments has referred to the case where an area occupied by a picked-up image of a face is detected, but the present invention is not limited to such a case and can be widely applied to various cases where various templates are applied to detect areas occupied by picked-up images of various objects, for example, a case where an area occupied by a picked-up image of a user's child needs to be detected.

In the above description of the first to fourth embodiments, reference has been made to the cases where the present invention is applied to an image pickup apparatus and a recording and reproducing apparatus using an optical disk, but the present invention is not limited to such a case and can be widely applied to recording and reproducing equipment using various recording media as well as image processing equipment such as printers. The present invention can be further applied to image processing software for computers and the like.

The present invention contains subject mater related to Japanese Patent Application No. JP2005-328256 filed in the Japanese Patent Office on Nov. 14, 2005, the entire contents of which being incorporated herein by reference.

What is claimed is:

1. An image processing apparatus comprising:
an image acquisition section which acquires an original image;
a resolution conversion section which converts the resolution of said original image acquired by said image acquisition section and generates a plurality of reduced images having different resolutions;
a detection section which processes by template matching using a template of said plurality of reduced images generated by said resolution conversion section and detects an area occupied by a picked-up image of a particular object corresponding to said template, from said reduced images; and
a detection result processing section which detects said area occupied by said picked-up image of said particular object on said original image, by processing a detection result obtained by said detection section,
said detection section detecting said area occupied by said picked-up image of said particular object by processing said plurality of reduced images in an order in which resolution sequentially varies on a step-by-step basis.

2. The image processing apparatus according to claim 1, wherein said image acquisition section is an image pickup section which acquires image data related to said original image based on an image pickup result, and
wherein said image processing apparatus has a recording medium which records said image data acquired by said image pickup section.

3. The image processing apparatus according to claim 2, further comprising a control section which controls the operation of each of said sections,
wherein said control section switches the order of processing of said plurality of reduced images related to processing in said detection section, in accordance with an image-taking mode which is set in said image pickup section.

4. The image processing apparatus according to claim 2, further comprising a control section which controls the operation of each of said sections,
wherein said control section switches said reduced images subjected to processing in said detection section, in accordance with an image-taking mode which is set in said image pickup section.

5. The image processing apparatus according to claim 1, wherein said image acquisition section is an image acquisition section associated with a recording medium, for acquiring image data related to said original image recorded on said recording medium.

6. The image processing apparatus according to claim 1, wherein said image acquisition section is a data communication section which performs data communication with an external device.

7. The image processing apparatus according to claim 1, further comprising a storage section which records and holds said plurality of reduced images generated by said resolution conversion section,
wherein said detection section sequentially processes said plurality of reduced images recorded on said storage section and processes said plurality of reduced images generated by said resolution conversion section.

8. The image processing apparatus according to claim 1, wherein said order related to said processing by said detection section, in which said resolution sequentially varies on a step-by-step basis, is an order in which said resolution sequentially increases.

9. The image processing apparatus according to claim 1, wherein said order related to said processing by said detection section, in which said resolution sequentially varies on a step-by-step basis, is an order in which said resolution sequentially decreases.

10. The image processing apparatus according to claim 1, wherein said detection result processing section converts the size of said template to a size on said original image on the basis of the size of said reduced image with respect to said original image.

11. The image processing apparatus according to claim 1, wherein said detection result processing section sets the priority order of said area occupied by said picked-up image of said particular object on said original image, on the basis of the order of detection detected by said detection section.

12. The image processing apparatus according to claim 1, further comprising a control section which controls the operation of each of said sections,
wherein said control section switches the order of processing of said plurality of reduced images related to processing in said detection section, on the basis of a past detection result obtained by said detection section.

13. The image processing apparatus according to claim 1, further comprising a control section which controls the operation of each of said sections,
wherein said control section switches said reduced images subjected to processing in said detection section on the basis of a past detection result obtained by said detection section.

14. An image processing method comprising:
an image acquisition step of acquiring an original image;
a resolution conversion step of converting the resolution of said original image acquired in said image acquisition step and generating a plurality of reduced images having different resolutions;
a detection step of processing by template matching using a template of said plurality of reduced images generated in said resolution conversion step and detecting an area occupied by a picked-up image of a particular object corresponding to said template, from said reduced images; and
a detection result processing step of detecting said area occupied by said picked-up image of said particular object on said original image, by processing a detection result obtained in said detection step,
said detection step detecting said area occupied by said picked-up image of said particular object by processing said plurality of reduced images in an order in which resolution sequentially varies on a step-by-step basis.

15. A non-transitory computer-readable memory or medium having recorded thereon a program for an image processing method, which processes images by being executed by operation processing means, comprising:
an image acquisition step of acquiring an original image;
a resolution conversion step of converting the resolution of said original image acquired in said image acquisition step and generating a plurality of reduced images having different resolutions;
a detection step of processing by template matching using a template of said plurality of reduced images generated in said resolution conversion step and detecting an area occupied by a picked-up image of a particular object corresponding to said template, from said reduced images; and
a detection result processing step of detecting said area occupied by said picked-up image of said particular object on said original image, by processing a detection result obtained in said detection step,
said detection step detecting said area occupied by said picked-up image of said particular object by processing said plurality of reduced images in an order in which resolution sequentially varies on a step-by-step basis.

16. A non-transitory recording medium which records a program for an image processing method of processing images by being executed by operation processing means, said program comprising:
an image acquisition step of acquiring an original image;
a resolution conversion step of converting the resolution of said original image acquired in said image acquisition step and generating a plurality of reduced images having different resolutions;
a detection step of processing by template matching using a template of said plurality of reduced images generated in said resolution conversion step and detecting an area occupied by a picked-up image of a particular object corresponding to said template, from said reduced images; and
a detection result processing step of detecting said area occupied by said picked-up image of said particular object on said original image, by processing a detection result obtained in said detection step,
said detection step detecting said area occupied by said picked-up image of said particular object by processing said plurality of reduced images in an order in which resolution sequentially varies on a step-by-step basis.

* * * * *